(12) United States Patent
Kim et al.

(10) Patent No.: US 6,246,822 B1
(45) Date of Patent: Jun. 12, 2001

(54) FIBER-COUPLED RECEIVER AND ASSOCIATED METHOD

(75) Inventors: Kyung Joon Kim, La Mirada; Robert Lynn Caswell, Fullerton; Cecil Leon Hayes, Placentia, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/313,862

(22) Filed: May 18, 1999

(51) Int. Cl.[7] ...................................................... G02B 6/06
(52) U.S. Cl. .............................................................. 385/116
(58) Field of Search ........................... 385/24, 25, 31–35, 385/147, 116, 117, 119

(56) References Cited

U.S. PATENT DOCUMENTS

| | | | | |
|---|---|---|---|---|
| 4,331,380 | * | 5/1982 | Rees et al. ............................. | 385/116 |
| 4,589,736 | | 5/1986 | Harringan et al. . | |
| 4,750,802 | * | 6/1988 | Bhagavatula ............................ | 385/33 |

\* cited by examiner

*Primary Examiner*—Akm E. Ullah
(74) *Attorney, Agent, or Firm*—Alston & Bird LLP (57) ABSTRACT

A fiber-coupled receiver and associated method are provided for detecting two-dimensional and three-dimensional images in a cost-effective manner. The fiber-coupled receiver includes a plurality of optical fibers extending between respective first and second ends. At least some of the optical fibers impose different optical delays such that signals that are received in parallel by the first ends of the optical fibers are emitted at different times from the second ends of the optical fibers. For example, at least some of the optical fibers can have different lengths to thereby impose different optical delays. The fiber-coupled receiver also includes at least one detector for receiving the signals emitted at different times from the second ends of the optical fibers such that the signals that are received in parallel by the first ends of the optical fibers are received in series by the detector. By presenting the signals in series to the detector, the fiber-coupled receiver need not include a detector having separate array elements for each optical fiber. Instead, the fiber-coupled receiver of the present invention has a significantly fewer number of detectors than the number of optical fibers since each detector can receive signals in series from a number of optical fibers.

19 Claims, 5 Drawing Sheets

FIBER-COUPLED RECEIVER AND ASSOCIATED METHOD

FIELD OF THE INVENTION

The present invention relates generally to receivers and, more particularly, to fiber-coupled receivers and associated methods for receiving an image.

BACKGROUND OF THE INVENTION

Fiber-coupled receivers are commonly employed to detect two-dimensional images. A fiber-coupled receiver generally includes a plurality of bundled optical fibers of equal length extending between opposed first and second ends. The first ends of the optical fibers are typically tightly packaged to receive the image information in parallel. In this regard, each optical fiber defines one pixel of the resulting image.

The fiber-coupled receiver also typically includes a lens for focusing the image upon the first ends of the optical fibers. While fiber-coupled receivers can detect two-dimensional images, fiber-coupled receivers can also be utilized to detect three-dimensional images. In this regard, the image information from a pulse-illuminated object would be received by the first ends of the optical fiber at slightly different times. As known to those skilled in the art, the initial signals that arrive at the first ends of the optical fibers will represent those portions of the object that is being imaged that are closest to the receiver, while signals that are received at progressively later times represent those portions of the object that are increasingly further from the receiver. By analyzing the times at which the signals are received by the first ends of the optical fibers, a three-dimensional image of the object can be reconstructed.

Conventional fiber-coupled receivers also include a detector having a plurality of array elements, one of which is generally associated with each optical fiber. In particular, each array element is generally positioned to receive the signals emitted by the second end of a respective optical fiber. Since each of the optical fibers has an equal length, the array elements receive and process the signals in parallel. In addition to detecting the signals provided by the second ends of the optical fibers, the detector generally amplifies the detected signals prior to further processing of the signals. As such, a typical detector can comprise a photo-multiplier tube having a plurality of anodes, each of which both detects and amplifies the signals emitted by the second end of a respective optical fiber.

A conventional fiber-coupled receiver also generally includes a digitizer for receiving the amplified signals from the detector and for creating a digital representation of the signals. In addition, a conventional fiber-coupled receiver typically includes a signal processor for receiving the digitized representations of the signals and for reconstructing the image. In this regard, each optical fiber corresponds to a respective pixel of the resulting image with the position of the pixel based upon the position of the first end of the respective optical fibers relative to the first ends of the other optical fibers. For a receiver designed to detect three-dimensional images, the signal processor will also analyze the differences in time at which the signals were received by the receiver, as described above.

While conventional fiber-coupled receivers can effectively detect two- and three-dimensional images, conventional fiber-coupled receivers are quite expensive and surprisingly heavy. In this regard, the requirement that conventional fiber-coupled receivers include a detector, a signal amplifier and a signal processor associated with each optical fiber significantly increases the overall cost of the receiver. As such, conventional fiber-coupled receivers may not be employed in cost-sensitive or weight-constrained imaging applications in view of their substantial costs and weight penalty.

SUMMARY OF THE INVENTION

A fiber-coupled receiver and associated method are therefore provided according to the present invention for detecting two-dimensional and three-dimensional images of an object illuminated by a modulated source in a cost-effective manner. In this regard, the fiber-coupled receiver utilizes a plurality of optical fibers as signal delay line elements extending between respective first and second ends. According to the present invention, at least some of the optical fibers impose different optical delays such that signals that are received in parallel by the first ends of the optical fibers are emitted at different times from the second ends of the optical fibers. To impose different optical delays, at least some of the optical fibers can have different lengths. The fiber-coupled receiver also includes at least one detector for receiving the signals emitted at different times from the second ends of the optical fibers such that the signals that are received in parallel by the first ends of the optical fibers are received in series by the detector. By presenting the signals in series to the detector, the fiber-coupled receiver of the present invention need not include either a detector having separate array elements for each optical fiber or a separate detector for each optical fiber. Instead, the fiber-coupled receiver of the present invention includes a significantly fewer number of detectors than the number of optical fibers since each detector can receive signals in series from a number of optical fibers. By reducing the number of detectors, the fiber-coupled receiver and associated method of the present invention are significantly less expensive than conventional fiber-coupled receivers and are therefore particularly useful in cost-sensitive applications.

The fiber-coupled receiver can also include a digitizer for receiving the signals from the detector and for digitizing the signals. The fiber-coupled receiver can also include a signal processor for receiving the digitized signals and for reconstructing the corresponding image, either in two dimensions or in three dimensions as described below.

According to one advantageous embodiment, the fiber-coupled receiver is designed to detect a three-dimensional image of an object illuminated by a pulsed source. Since the image information relates to a three-dimensional image, the image information is received by the first ends of the optical fibers, not at the same time, but over a predetermined period of time. In order to retain the array element position information provided by the differences in time at which the image information is received by the first ends of the optical fibers, the differences in length of the optical fibers should be sufficiently long to introduce an optical delay relative to the other optical fibers that separates the image signals from each other. As such, the differences in time at which the image information signal is received by the first ends of the optical fiber can be readily distinguished from the much longer optical delays imposed upon the signals as a result of the differences in length of the optical fibers. By analyzing the differences in time at which the image information was received by the first ends of the optical fibers, the signal processor of the fiber-coupled receiver of the present invention can reconstruct a three-dimensional image.

According to one embodiment, the fiber-coupled receiver includes a plurality of detectors for receiving the signals emitted from the second ends of respective subsets of the plurality of optical fibers. Since each optical fiber of a respective subset of optical fibers imposes a different optical delay, such as by having a different length, the signals are presented in series to each detector. Although the fiber-coupled receiver of this embodiment includes a plurality of detectors, the fiber-coupled receiver still need not include the same number of detectors as optical fibers since a single detector can receive the signals emitted in series by a plurality of optical fibers.

Since the fiber-coupled receiver and associated method of the present invention need not include either a detector having at least as many array elements as optical fibers or the same number of detectors as optical fibers, the fiber-coupled receiver of the present invention will be less expensive and lighter in weight. In addition, the fiber-coupled receiver and associated method of the present invention can include fewer signal amplifiers and signal processors than the number of optical fibers. As such, the fiber-coupled receiver and associated method can be employed in a broader range of applications, including many cost-sensitive, weight constrained imaging applications.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
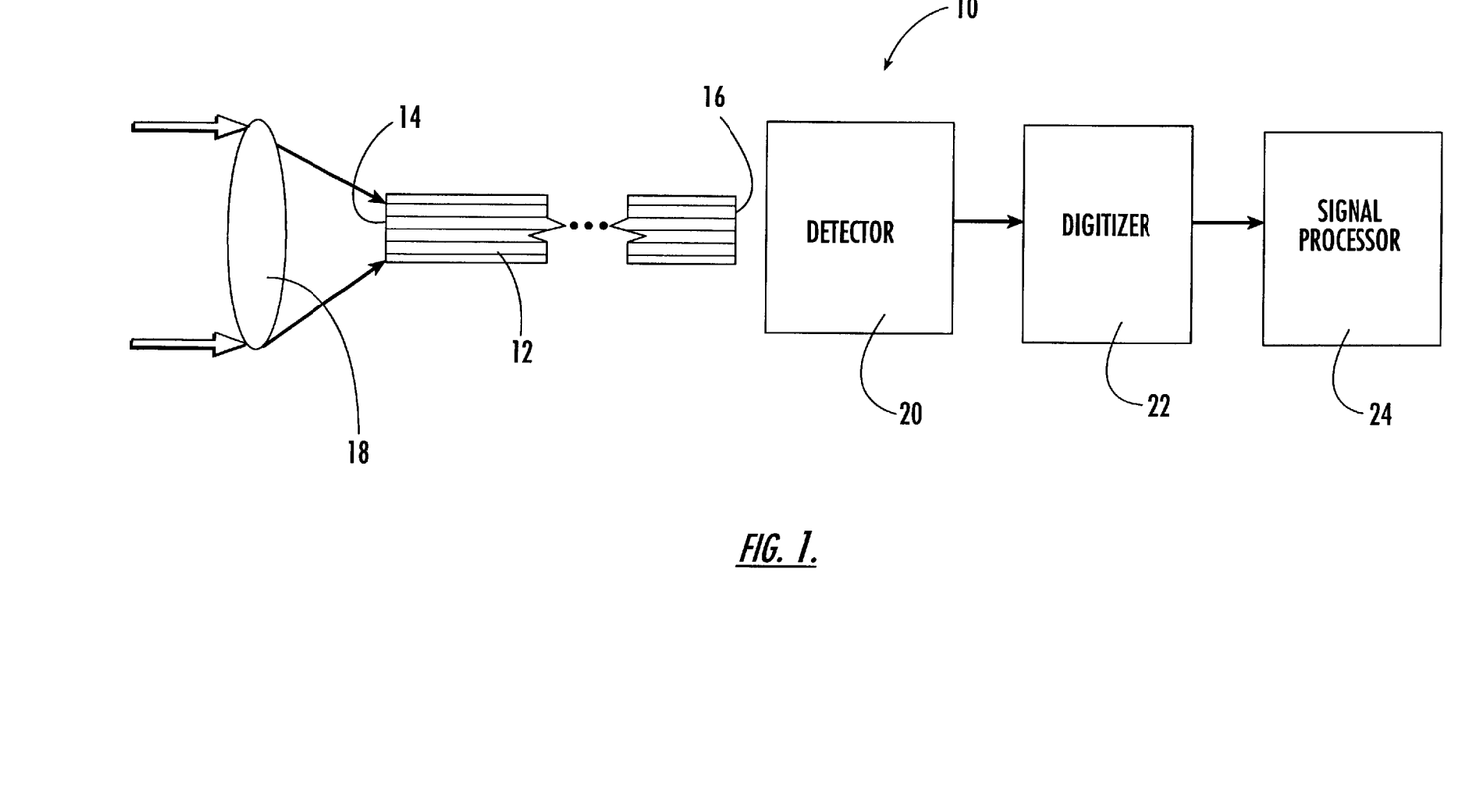
FIG. 1 is a block diagram illustrating a fiber-coupled receiver according to one embodiment of the present invention.
Figure 2:
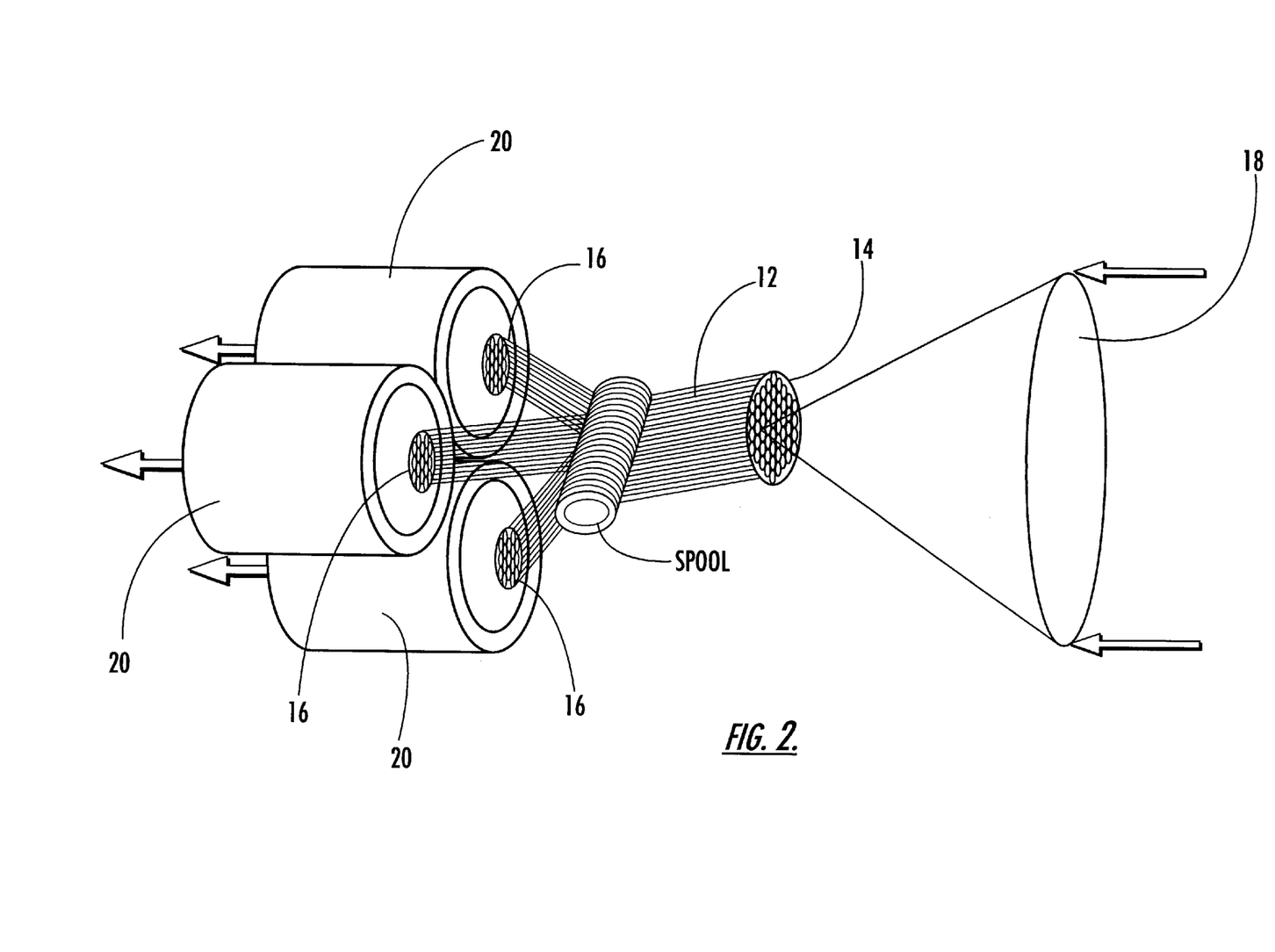
FIG. 2 is a schematic representation of a portion of the fiber-coupled receiver in FIG. 1.

Referring now to FIG. 1, the fiber-coupled receiver 10 according to one embodiment of the present invention is illustrated. The fiber-coupled receiver includes a plurality of optical fibers 12 extending between respective first and second ends 14 and 16. As shown in FIG. 2, the first ends of the optical fibers can be bundled or otherwise tightly packaged such that the first ends of the optical fibers are disposed in a common focal plane. Although not necessary for the practice of the present invention, the fiber-coupled receiver can also include a micro-lens array 18 for focusing image information upon the first ends of the optical fibers. See, for example, FIG. 2.

The fiber-coupled receiver 10 also includes at least one detector 20 for receiving the signals emitted by the second ends 16 of the optical fibers 12. Although the fiber-coupled receiver can include a variety of detectors, the fiber-coupled receiver of one advantageous embodiment includes at least one photo-multiplier tube, such as a GaAsP Intensified Photo-Diode (IPD) tube, that not only detects the signals emitted by the second ends of the optical fibers, but also amplifies the detected signals to facilitate the subsequent processing of the signals. Typically, the time jitter of the photo-multiplier tube is less than 1.4 nanoseconds for 20 cm image resolution.

Since the signals detected and amplified by the detector 20 are analog signals representative of the image information received by the fiber-coupled receiver 10, the fiber-coupled receiver generally includes a digitizer 22, such as a Tektronix TDS 784A digital scope, for digitizing the signals. As shown in FIG. 1, the fiber-coupled receiver can also include a signal processor 24, such as a PCI frame grabber supplied by Data Translations, for receiving the digitized signals from the digitizer and for reconstructing the detected image. Typically, both the digitizer and the signal processor have 6 to 10 bit resolution. Although not necessary for the practice of the present invention, the signal processor can reconstruct the image with intensity interpolation as known to those skilled in the art. The signal processor can then display or store the reconstructed image, as desired by the particular application.

According to the present invention, at least some of the optical fibers 12 of the fiber-coupled receiver 10 impose different optical delays upon the signals propagating therethrough. As such, the image information that is received in parallel by the first ends 14 of the optical fibers is emitted at different times from the second ends 16 of the optical fibers. More particularly, the different optical delays imposed by the optical fibers cause the image information that is received in parallel by the first ends of the optical fibers to be emitted in series from the second ends of the optical fibers. While a fiber-coupled receiver can include a variety of optical elements for introducing different optical delays to the signals propagating through different ones of the optical fibers, the optical delays are generally introduced by providing optical fibers having different lengths. See FIG. 3 in which the loops indicate additional lengths of optical fiber. As such, the time required for signals to propagate from the first end of an optical fiber to the opposed second end will vary in proportion to the length of the optical fiber such that longer optical fibers will impose longer propagation times while shorter optical fibers will impose shorter propagation times. Since the speed at which optical signals propagate through an optical fiber is well known, the time required for a signal to propagate from the first end of the optical fiber to the opposed second end can be precisely defined by appropriately sizing the length of the optical fiber. For example, signals typically require 20 nanoseconds to propagate through an optical fiber that is 2.055 meters in length.

Since the signals are not emitted in parallel from the second ends 16 of the optical fibers 12, but are, instead, emitted at different times, i.e. in a time multiplexed, serial fashion, the fiber-coupled receiver 10 need not include a detector having an array element dedicated to each optical fiber as in conventional designs. Likewise, the fiber-coupled receiver need not include a dedicated detector for each optical fiber. Instead, the fiber-coupled receiver of the present invention includes a fewer number of detectors 20 than the number of optical fibers since a single detector can receive the signals emitted in a serial fashion from different ones of the optical fibers, even though the image information was originally received at the first ends 14 of the optical fibers in a parallel fashion. Similarly, the fiber-coupled receiver of the present invention can include a fewer number of signal amplifiers and signal processors than conventional receivers since the fiber-coupled receiver typically has the same number of signal amplifiers and signal processors as detectors.

Figure 3:
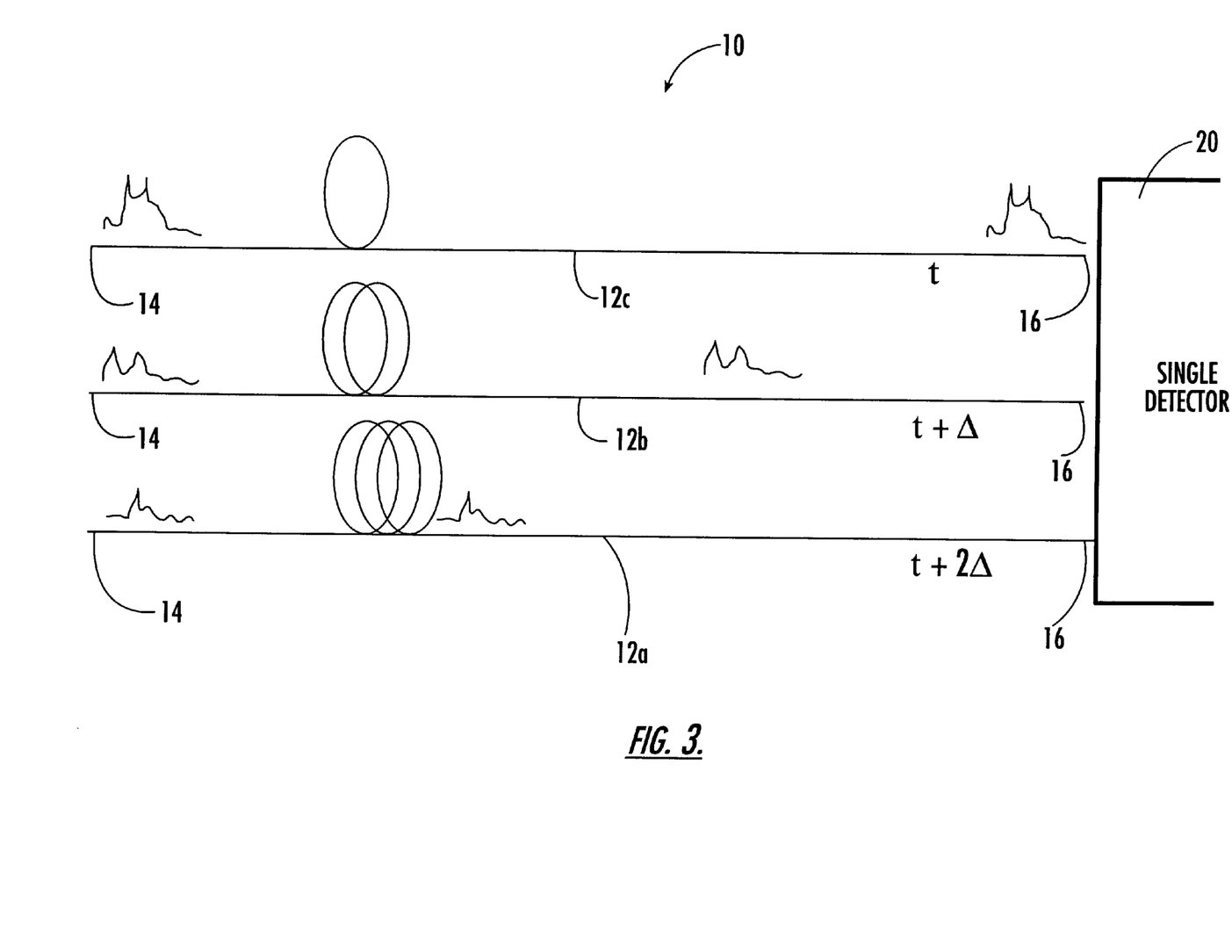
FIG. 3 is a schematic representation of a portion of a fiber-coupled receiver that includes a detector responsive to three optical fibers of different lengths that impose delays of t, t+$\Delta$ and t+2$\Delta$, respectively.

A portion of a fiber-coupled receiver 10 having three optical fibers 12a, 12b and 12c of different lengths and a single detector 20 for receiving the signals emitted by the second ends of the three optical fibers is illustrated in FIG. 3. For purposes of illustration, waveforms indicative of the signals received at the first ends of the three optical fibers and the relative timing of the signals emitted at the second ends of the three optical fibers are shown in FIG. 3, for an embodiment in which the fiber-coupled receiver is adapted to detect a two-dimensional image. As shown in FIG. 3, signals representative of the image are received by the first ends of each of the three optical fibers at the same time. Since the first optical fiber 12a is longer than the second optical fiber 12b which, in turn, is longer than the third optical fiber 12c, the signals propagating through the first optical fiber will have a greater optical delay than the signals propagating through the second optical fiber, while the signals propagating through the second optical fiber will have a greater optical delay than the signals propagating through the third optical fiber. As such, a signal will be initially emitted by the third optical fiber. Thereafter, signals will be emitted by the second optical fiber and, finally, by the first optical fiber. See FIG. 3. Since the signals are emitted at different times by the second ends of the three optical fibers, a single detector can receive the signals emitted by each of the three optical fibers in a serial fashion.

After the signals have been digitized, the signal processor 24 can remove the optical delays introduced by the differences in length of the optical fibers 12 in order to recapture the image information received by the first ends of the optical fibers and, in turn, to reconstruct the original image. In this regard, the resulting image is comprised of a plurality of pixels, each of which corresponds to a respective optical fiber. As such, the illumination of a particular pixel in the resulting image depends upon the signals received by the first end of the respective optical fiber. In addition, the position of the pixel within the resulting image is defined by the signal time delay with respect to the signal emitted by the shortest optical fiber length since the signal time delay will pinpoint the respective optical fiber and its associated position.

In addition to detecting two-dimensional images, the fiber-coupled receiver 10 of the present invention can detect three-dimensional images. In this regard, the first ends 14 of the optical fibers 12 may receive image information relating to a three-dimensional image over a predetermined period of time $\Delta T$, such as 5 nanoseconds. Typically, the image information that is initially received by the first ends of the optical fibers has been reflected from those portions of the object that is being imaged that are closest to the first ends of the optical fibers. Likewise, the image information that is received by the first ends of the optical fibers at successively later times has generally been reflected from portions of the object to be imaged that are increasingly further from the first ends of the optical fiber.

For example, a three-dimensional object, such as a cone, may be illuminated by a pulse of light, such as laser pulse. In instances in which the cone is disposed such that the apex of the cone is pointed toward the first ends 14 of the optical fibers 12 of the fiber-coupled receiver 10 and the base of the cone is directed away from the first ends of the optical fibers, the signals that are initially received by the first ends of the optical fibers will correspond to light that has reflected from the apex of the cone since the apex of the cone is nearest to the first ends of the optical fibers. The signals that are thereafter received by the first ends of the optical fibers at successively later times will correspond to light that has reflected from other portions of the cone that are further from the first ends of the optical fibers. Consequently, the final signals received by the first ends of the optical fibers will correspond to light that has reflected from the perimeter of the base of the cone that is furthest from the first ends of the optical fibers.

In order to clearly distinguish between the differences in time at which the signals are received by the first ends 14 of the optical fibers 12 and the optical delays imparted by the differences in length of the optical fibers themselves and to thereby retain the position information provided by the differences in time at which the signals are received by the first ends of the optical fibers, the fiber-coupled receiver 10 is preferably designed such that each optical fiber introduces an optical delay that is at least as great, relative to the next shortest optical fiber, as the predetermined period of time in which the signals relating to a three-dimensional image are received by the first ends of the optical fibers. For example, the optical delay imparted by each optical fiber relative to the next shortest fiber may be 20 nanoseconds while the signals relating to an object that is 1.5 meters in length may be received at any time within a 10 nanosecond window.

Referring now to FIG. 3, for example, waveforms illustrating the signals that are received and emitted, respectively, by the three optical fibers 12 of FIG. 3 are shown in conjunction with a fiber-coupled receiver 20 designed to detect three-dimensional images. As shown in FIG. 3, signals are initially received at the first end of the first optical fiber 12a and are thereafter received at the first end of the second optical fiber 12b and, finally, at the first end of the third optical fiber 12c. Consequently, the signals that are received by the first end of the first optical fiber relate to a portion of the object to be imaged that is closer to the first ends of the optical fibers than those portions of the object that are represented by the signals received by the first ends of either the second or third optical fibers. As shown in FIG. 3, the first optical fiber is longer than the second optical fiber which, in turn, is longer than the third optical fiber so as to impose corresponding optical delays of $\Delta$ and $2\Delta$, respectively. These optical delays are manifested in the signals emitted by the second ends of the three optical fibers as depicted in FIG. 3. As shown, the signals emitted by the third optical fiber are emitted prior to the signals emitted by the second optical fiber which, in turn, are emitted prior to the signals emitted by the first optical fiber as a result of the differences in length of the respective optical fibers. Since the optical delays imposed by the differences in length of the three optical fibers are each greater than the predetermined period of time in which the signals relating to a three-dimensional image are received, signals are initially emitted by the second end of the third optical fiber even though the signals are received by the first end of the third optical fiber at the latest possible time within the predetermined period of time. As such, the detector of the fiber-coupled receiver can receive the signals emitted by each of the three optical fibers in series while still permitting the position information provided by the differences in time at which signals are received by the optical fibers to be retained and extracted.

Like the processing of the signals relating to a two-dimensional image, the signals received by a detector 20 are initially digitized and are then provided to a signal processor 24 for reconstructing the corresponding image. In addition to determining the location of each pixel based upon the corresponding location of the first end 14 of the respective optical fiber 12, the signal processor determines the relative position upon the object to be imaged from which the light represented by each pixel has reflected, i.e., the signal processor determines the relative distance from the first ends of the optical fibers at which the light reflected. With respect to the creation of an image of a cone, for example, the signal processor can determine if the light reflected from the apex of the cone, the base of the cone or any point in between. As such, the signal processor can reconstruct a three-dimensional image of the object in an efficient manner.

Figure 5:
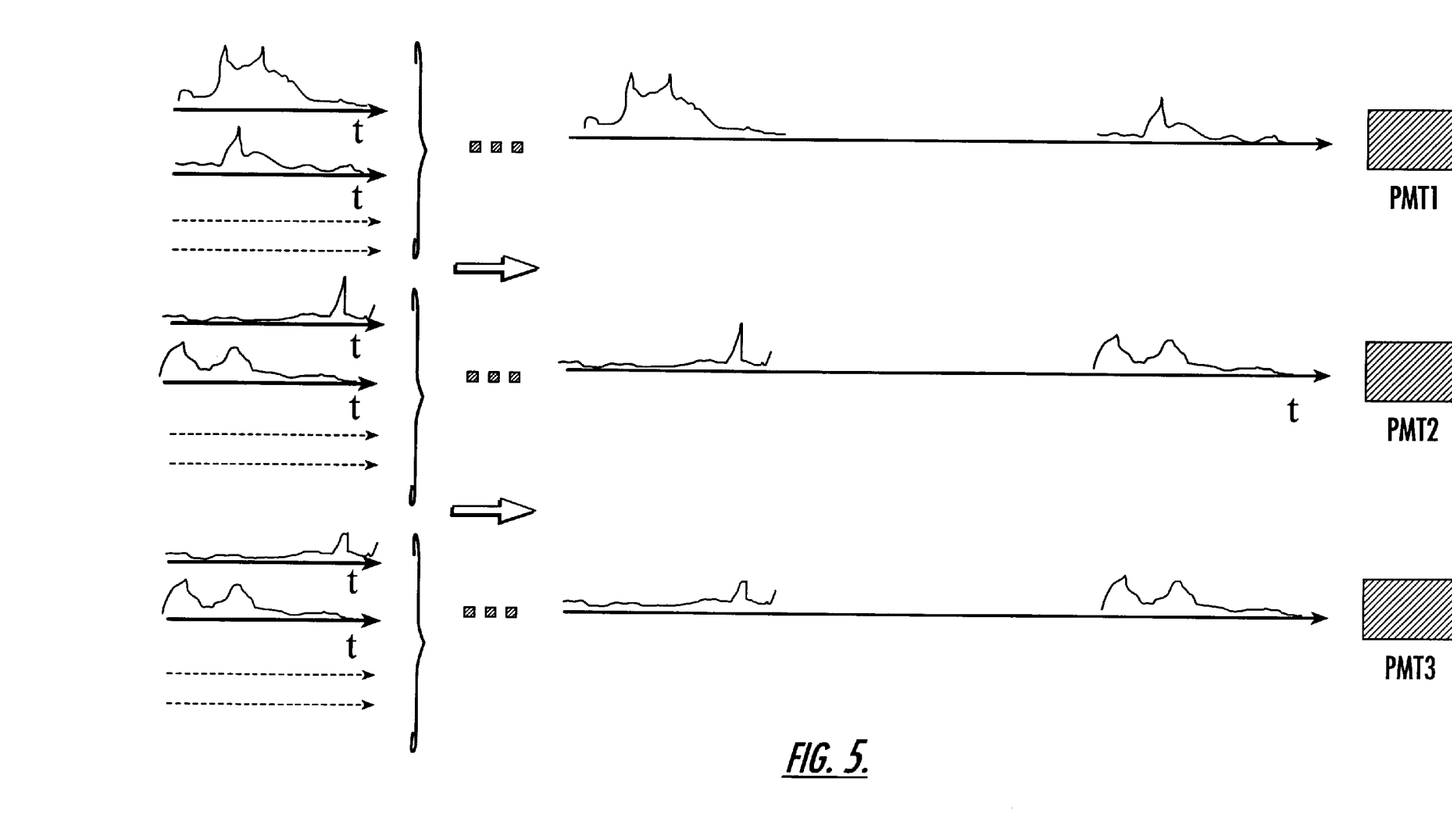
FIG. 5 illustrates waveforms of the signals received at the first ends of the optical fibers and the signals emitted at the second ends of the optical fibers to three photo-multiplier tube detectors.

Although the fiber-coupled receiver 10 of the present invention need only include a single detector 20, the fiber-coupled receiver can include a plurality of detectors. Even in instances in which the fiber-coupled receiver has a plurality of receivers, however, the fiber-coupled receiver has significantly fewer detectors than the number of optical fibers 12. As such, the fiber-coupled receiver of FIG. 2 that includes three detectors is still significantly less expensive than conventional fiber-coupled receivers that typically include a detector having as many array elements as the number of optical fibers. For an array that includes more than 18 fibers as shown in FIG. 5, additional detectors are preferably utilized to keep the signal attenuation of the longest fiber less than 3 dB.

In this regard, a fiber-coupled receiver 10 according to the present invention that includes a plurality of detectors 20 is preferably configured such that the plurality of optical fibers 12 are segregated into a plurality of subsets, one of which is associated with each detector. See FIG. 2. For example, the signals emitted by the second ends 16 of the optical fibers of a first subset are detected by the first detector, while the signals emitted by the second ends of the optical fibers of a second subset are detected by the second detector and the signals emitted by the seconds ends of the optical fibers of a third subset are detected by the third detector.

Figure 4:
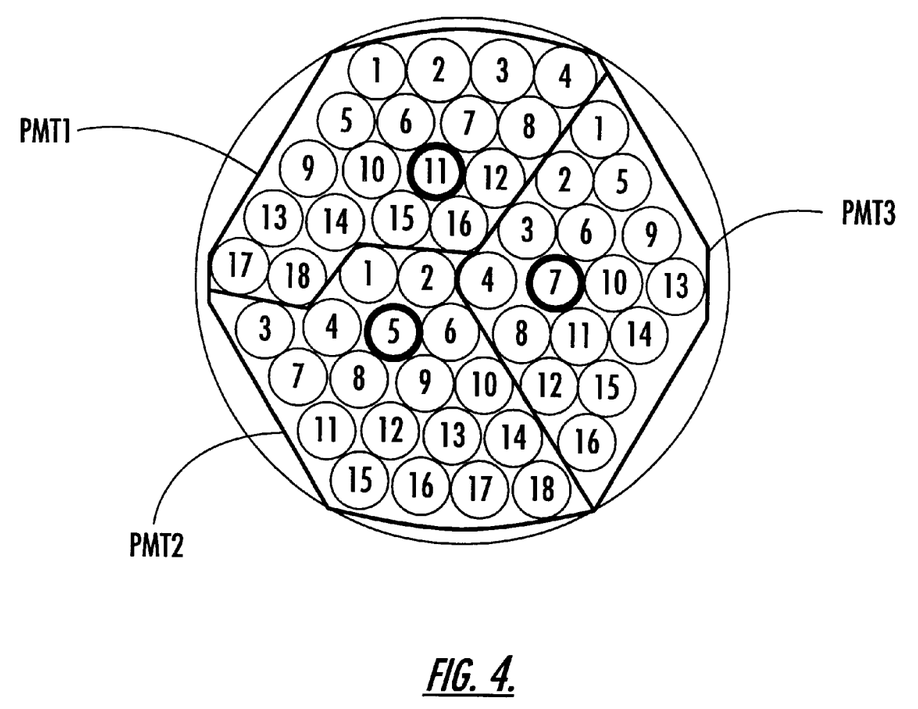
FIG. 4 is an end view of the optical fibers of the fiber-coupled receiver of one embodiment of the present invention in which the optical fibers are divided into three subsets for delivering optical signals to three detectors, respectively.

Although the fiber-coupled receiver 10 can include any number of optical fibers 12, the fiber-coupled receiver of one embodiment includes fifty-two fibers; the first ends 14 of which are shown in FIG. 2 and, in more detail, in FIG. 4. As described above, in embodiments in which the fiber-coupled receiver includes three detectors 20, the optical fibers can also be divided into three subsets as graphically indicated in FIG. 4. For example, the optical fibers can be divided into a first subset that includes the upper leftmost optical fibers that illuminate a first detector PMT1, a second subset that includes the lower leftmost optical fibers that illuminate a second detector PMT2 and a third subset that includes the rightmost optical fibers that illuminate a third detector PMT3.

Each subset includes a reference fiber that has the shortest length and is designated in FIG. 4 with a dark circle and a plurality of longer fibers having different lengths. As a result, within each subset of optical fibers, each optical fiber preferably imposes a different optical delay, such as by having a different length. As such, each detector will receive the signals emitted by the second ends of the respective subset of optical fibers in series as a result of the different optical delays imposed by the optical fibers of the respective subset. However, each detector can operate in parallel with the other detectors such that each detector is simultaneously receiving the signals emitted from the second ends of the respective subset of optical fibers in a serial fashion.

As depicted in FIG. 5, for example, a fiber-coupled receiver 10 can have three subsets of optical fibers 12 for illuminating three detectors 20, designated PMT1, PMT2 and PMT3. To the left of the brackets, the signals received by the first ends 14 of each subset of optical fibers are depicted. Following propagation through the optical fibers, each subset of optical fibers delivers the signals to the respective detector 20 in a serial fashion as graphically depicted in FIG. 5 in which a time delay has been imposed between the signals.

Accordingly, the fiber-coupled receiver 10 of the present invention can be designed to strike an appropriate balance between cost and image resolution (or array size) with more detectors 20 increasing the image resolution at which the fiber-coupled receiver detects an image while correspondingly increasing the cost of the receiver. Nevertheless, since the fiber-coupled receiver of the present invention includes only one or a small number of detectors, the resulting fiber-coupled receiver is significantly less expensive than conventional fiber-coupled receivers. As such, the fiber-coupled receiver can be used in a wider variety of applications, including a number of cost-sensitive imaging applications.

Many modifications and other embodiments of the invention will come to mind to one skilled in the art to which this invention pertains having the benefit of the teachings presented in the foregoing descriptions and the associated drawings. These include use of other forms of modulation of the illuminator, use of acoustics and acoustic delays, and the use of other types of detectors. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber-coupled receiver comprising:
    a plurality of optical fibers extending between respective first and second ends, wherein the first ends of said optical fibers are disposed to receive image information in parallel, and wherein at least some of said optical fibers have different lengths such that the image information that is received in parallel by the first ends of said optical fibers is emitted at different times from the second ends of said optical fibers; and
    at least one detector for receiving the signals emitted at different times from the second ends of said optical fibers such that the image information that is received in parallel by the first ends of said optical fibers is received in series by said at least one detector.

2. A fiber-coupled receiver according to claim 1 wherein the first ends of said optical fibers are disposed to receive image information relating to a three-dimensional image over a predetermined period of time, and wherein the differences in length between said optical fibers each introduce an optical delay that is at least as great as the predetermined period of time.

3. A fiber-coupled receiver according to claim 1 wherein said at least one detector comprises a plurality of detectors for receiving the signals emitted from the second ends of respective subsets of said plurality of optical fibers, and wherein each optical fiber of a respective subset of optical fibers has a different length.

4. A fiber-coupled receiver according to claim 1 further comprising a signal processor for receiving the image information from said at least one detector and for reconstructing the corresponding image.

5. A fiber-coupled receiver according to claim 4 further comprising a digitizer for receiving the image information from said at least one detector and for digitizing the received image information, wherein said signal processor receives the digitized image information from said digitizer.

6. A fiber-coupled receiver according to claim 1 wherein the first ends of said plurality of optical fibers are disposed in a common plane.

7. A fiber-coupled receiver comprising:

a plurality of optical fibers extending between respective first and second ends, wherein at least some of said optical fibers impose different optical delays such that image information that is received in parallel by the first ends of said optical fibers is emitted at different times from the second ends of said optical fibers;

at least one detector for receiving the signals emitted at different times from the second ends of said optical fibers such that the image information that is received in parallel by the first ends of said optical fibers is received in series by said at least one detector; and a signal processor for receiving the image information in series from said at least one detector and for reconstructing the corresponding image.

8. A fiber-coupled receiver according to claim 7 wherein at least some of said optical fibers have different lengths to thereby impose different optical delays upon the image information.

9. A fiber-coupled receiver according to claim 7 wherein the first ends of said optical fibers are disposed to receive image information relating to a three-dimensional image over a predetermined period of time, and wherein the optical delays imposed by said optical fibers each introduce an optical delay that is at least as great as the predetermined period of time.

10. A fiber-coupled receiver according to claim 7 wherein said at least one detector comprises a plurality of detectors for receiving the signals emitted from the second ends of respective subsets of said plurality of optical fibers, and wherein each optical fiber of a respective subset of optical fibers imposes a different optical delay.

11. A fiber-coupled receiver according to claim 7 further comprising a digitizer for receiving the image information from said at least one detector and for digitizing the received image information, wherein said signal processor receives the digitized image information from said digitizer.

12. A fiber-coupled receiver according to claim 7 wherein the first ends of said plurality of optical fibers are disposed in a common plane.

13. A method for receiving an image comprising the steps of:

providing a plurality of optical fibers extending between respective first and second ends;

receiving image information in parallel at the first ends of the optical fibers;

transmitting the image information via the optical fibers to at least one detector, wherein said transmitting step imposes different optical delays for the signals propagating through at least some of the optical fibers such that the image information is emitted at different times from the second ends of the optical fibers;

detecting the image information that is emitted at different times from the second ends of the optical fibers such that the image information that is received in parallel by the first ends of said optical fibers is detected in series by the at least one detector; and reconstructing the image based upon the image information that is detected in series.

14. A method according to claim 13 wherein said providing step comprises providing a plurality of optical fibers having different lengths for imposing different optical delays during said transmitting step.

15. A method according to claim 13 wherein said receiving step comprises receiving image information over a predetermined period of time that relates to a three-dimensional image, and wherein said transmitting step comprises imposing optical delays that are each at least as great as the predetermined period of time.

16. A method according to claim 13 further comprising serially receiving the image information delivered at different times by the second ends of the optical fibers with at least one detector.

17. A method according to claim 16 wherein said serially receiving step comprises simultaneously receiving with a plurality of detectors image information based upon the signals emitted from the second ends of respective subsets of said plurality of optical fibers, and wherein said transmitting step comprises imposing a different optical delay upon the image information with each optical fiber of a respective subset of optical fibers.

18. A method according to claim 13 further comprising digitizing the image information that is delivered by the second ends of the optical fibers prior to reconstructing the image.

19. A method according to claim 13 wherein said providing step comprised disposing the first ends of the plurality of optical fibers in a common plane.

* * * * *